(12) United States Patent
Albou et al.

(10) Patent No.: US 7,364,334 B2
(45) Date of Patent: Apr. 29, 2008

(54) HEADLIGHT FOR A MOTOR VEHICLE GIVING A CUTOFF BEAM

(75) Inventors: Pierre Albou, Bobigny (FR); Benoit Reiss, Bobigny (FR)

(73) Assignee: Valeo Vision, Bobigny Cedex (FR)

( * ) Notice: Subject to any disclaimer, the term of this patent is extended or adjusted under 35 U.S.C. 154(b) by 20 days.

(21) Appl. No.: 11/265,848

(22) Filed: Nov. 2, 2005

(65) Prior Publication Data

US 2006/0092648 A1 May 4, 2006

(30) Foreign Application Priority Data

Nov. 4, 2004 (FR) .................................. 04 11785

(51) Int. Cl.
*F21V 11/00* (2006.01)
(52) U.S. Cl. ..................... 362/539; 362/516; 362/520
(58) Field of Classification Search ................ 362/475, 362/538, 544, 539, 520–522, 512–514, 516–518, 362/509, 308, 309, 329, 351, 355, 360, 361
See application file for complete search history.

(56) References Cited

U.S. PATENT DOCUMENTS

| 1,598,044 | A | * | 8/1926 | Bone ........................... 362/308 |
| 3,184,592 | A | | 5/1965 | Cibie ........................ 240/41.35 |
| 4,953,063 | A | * | 8/1990 | Nino ........................... 362/539 |
| 5,537,008 | A | * | 7/1996 | Matsuda et al. ........ 315/200 R |
| 5,791,759 | A | | 8/1998 | Dassanayake et al. ........ 362/61 |
| 5,961,206 | A | | 10/1999 | Eichler |
| 6,129,447 | A | * | 10/2000 | Futami ......................... 362/522 |
| 6,481,865 | B2 | * | 11/2002 | Woerner et al. .............. 362/41 |
| 6,650,058 | B1 | | 11/2003 | Wang |
| 2002/0085387 | A1 | | 7/2002 | Taniuchi |
| 2004/0228139 | A1 | | 11/2004 | Taniuchi ..................... 362/639 |
| 2004/0240223 | A1 | | 12/2004 | Brun et al. |

FOREIGN PATENT DOCUMENTS

| DE | 10030362 | 1/2002 |
| EP | 0 933 585 | 8/1999 |
| EP | 1 213 532 A2 | 6/2002 |
| EP | 1 433 999 A1 | 6/2004 |
| EP | 1 213 532 A3 | 7/2004 |
| FR | 2 637 046 | 9/1989 |
| FR | 2 774 150 | 7/1999 |

OTHER PUBLICATIONS

Dialog English Abstract for EP 0 933 585.

(Continued)

*Primary Examiner*—Bao Q Truong
(74) *Attorney, Agent, or Firm*—Morgan & Finnegan, LLP

(57) ABSTRACT

The object of the invention is a light, for a motor vehicle, giving a cutoff beam, in particular of the fog type, having an optical axis. The light having a light source having a filament, the overall shape of which is substantially cylindrical and the axis of which is substantially horizontal, the filament extending obliquely or perpendicular to the optical axis of the light, and at least one reflector producing a reflected light beam with cutoff. The light includes, in front of the light source, a lens producing a light beam with cutoff.

24 Claims, 5 Drawing Sheets

OTHER PUBLICATIONS

Dialog English Abstract for FR 2 774 150.
DIALOG English Language Abstract for EP 1 433 999.
DIALOG English Language Abstract for FR 2 637 046.
French Search Report dated May 13, 2005.
DIALOG English Language Abstract for EP 1 433 999, Jun. 30, 2004.
DIALOG English Language Abstract for FR 2 637 046, Sep. 28, 1989.
Dialog English Abstract for EP 0 933 585, Aug. 4, 1999.
Dialog English Abstract for FR 2 774 150, Jul. 30, 1999.
English Abstract for DE10030362, Jan. 3, 2002 (10030362 DE).
EPO Form PO460 dated Jan. 30, 2006 from EP 05 29 2091.

* cited by examiner

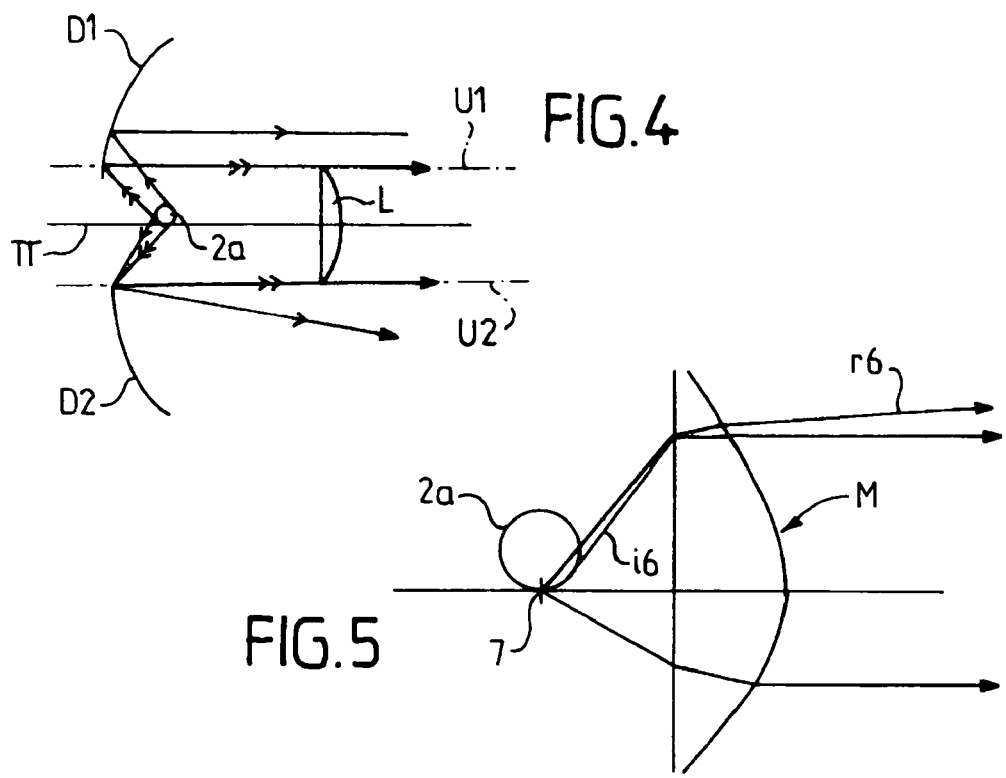
FIG.4
FIG.5
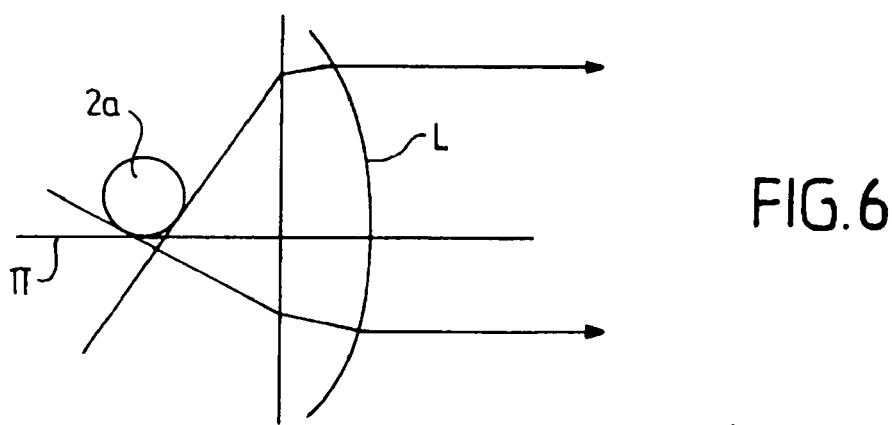
FIG.6
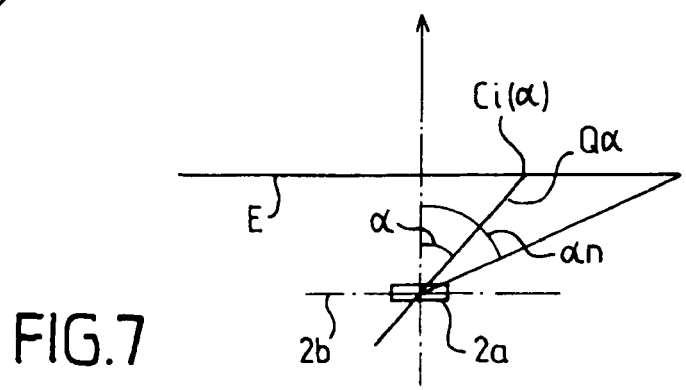
FIG.7

HEADLIGHT FOR A MOTOR VEHICLE GIVING A CUTOFF BEAM

FIELD OF THE INVENTION

The invention relates to a light for a motor vehicle giving a cutoff beam, a light of the type that has an optical axis and comprises a light source, the general shape of which may be substantially spherical or cylindrical, comprising a filament with a substantially horizontal axis extending obliquely or perpendicularly to the optical axis of the light, and at least one reflector giving a reflected light beam with cutoff.

BACKGROUND OF THE INVENTION

The invention concerns more particularly, but not exclusively, a light of the fog type.

The patents FR-A-2 774 150 or EP 933 585 show a light of this type with reflectors whose surface is determined so as to provide the cutoff beam, that is to say the light rays of the reflected beam are situated essentially below a cutoff line which may be horizontal, or which may be formed by a broken line in the case of a dipped headlight. The light source used is fairly powerful so that the fraction of the light emitted towards the rear in the direction of the reflector suffices to produce the required light beam. In order to avoid the light emitted towards the front by the light source creating dazzling by direct observation, a shield is generally provided situated in front of the light source. Part of the light flux is therefore used for the lighting beam, which does not prevent satisfying the photometric pattern conditions for the light beam in the case of a high-power source.

The heat given off by such a high-power light source on the one hand requires closing the housing of the light with a glass cover in order to resist the high temperature and on the other hand imposes a relatively great distance between the light source and the glass, which gives rise to a significant size of the housing in terms of depth.

The purpose of the invention is in particular to provide a light beam of the type defined above which makes it possible to obtain a satisfactory light beam with a light source of relatively low power, and which is relatively compact. It is also wished for the heating due to the light source to be sufficiently small to make it possible to use a cover made from plastics material with a reduced space requirement.

Another aim of the invention is to provide a light that allows simple and rapid adjustment of the cutoff of the beam in the vertical direction.

SUMMARY OF THE INVENTION

The invention concerns a light for a motor vehicle giving a beam with cutoff, in particular of the fog type, having an optical axis and comprising a light source comprising a filament whose general shape is substantially cylindrical, with the axis of the said filament preferably substantially horizontal, the said filament extending obliquely or perpendicularly to the optical axis of the light, and at least one reflector giving a reflected light beam with cutoff. The light according to the invention also comprises, in front of the light source (2), a lens (L) determined so as to give a light beam with cutoff.

Light source, within the meaning of the invention, means the global component of the lamp type, comprising at least one filament emitting light, and a transparent envelope. This envelope may for example be cylindrical or spherical in shape. As for the emitting filament, it is generally a case of a wire in the form of a helical winding for example, but the overall form, the envelope, is approximated in a known fashion in this field by a cylinder.

Thus the light emitted directly towards the front by the light source is recovered by the lens and inserted in the beam, without causing dazzling to a driver coming in the opposite direction. By virtue of this recovery of part of the light flux, the light source can be of low power and provide a flux less than that generated by a lamp of the dipped-beam type, normally used also for a fog function, in particular below 1000 lumens, in particular less than or equal to 900 or 600 lumens, whilst making it possible to obtain a satisfactory photometric pattern.

The lens is preferably determined so that the extreme incident rays are refracted, on exiting the lens, substantially parallel to the optical axis, whilst the other light rays emitted by the rest of the source are refracted with a downward inclination with respect to the said optical axis.

Generally, the light source is oriented perpendicular to the optical axis, but the angle between the geometric axis of the light source and the optical axis could be different from 90°.

The light source is preferably mounted so as to be fixed with respect to the housing of the light; the reflectors and lens are fixed to each other and are mounted so as to rotate about the geometric axis of the light source for the vertical adjustment of the cutoff.

The light source can consist of a lamp with an axial filament, disposed transversely. The light can be produced from plastics material, in particular thermoplastic.

The entry surface of the lens may be planar, rectangular and vertical. The exit face of the lens can be "fresnelised", that is to say of the Fresnel lens type in the vertical direction and in the horizontal direction. The exit face of the lens has pads or blocks making it possible to obtain the required beam with a lens of reduced thickness. The exit face of the lens can have a mesh of blocks in two families of curves.

The lens is asymmetric at the top and bottom and is curved in plan view.

The reflector can comprise at least four elementary sectors (or reflectors), the two first sectors of which extend on each side of the optical axis, respectively above and below the horizontal plane passing through the optical axis, the other two sectors lying between the first two and situated respectively above and below this plane.

The first two sectors are designed so that the reflected rays pass round the obstacles consisting of the lens and the light source.

The sector of the reflector situated towards the outside can be associated with a second non-contiguous sector with a longer focal length.

The sectors situated on each side of the horizontal plane passing through the optical axis are parts of a single reflector. These sectors have a focal length less than that of the other two sectors so as to be placed in front of the lateral sectors, in particular in order to produce couplings placed in the shadow of the top and bottom sectors and not creating any dazzling.

The focal lengths of the sectors are perfectly equal to or less than 15 mm when the compactness of the reflector is favoured.

According to another aspect, the invention also concerns a lighting and/or signalling device for a motor vehicle comprising a light as described briefly above and at least one supplementary light source dedicated to the implementation of another lighting and/or signalling function.

According to one particular embodiment, the light fulfils a fog function and the other lighting and/or signalling function is a daytime running function.

The supplementary light source is preferably mounted parallel or transverse to the optical axis of the device.

According to another particular characteristic, the device comprises a housing with an internal surface having at least one reflective part able to reflect light beams emitted directly or indirectly by the supplementary light source.

According to yet another characteristic, the device comprises a lens associated with the supplementary light source and forming an extension of the lens of the light.

The invention consists, apart from the provisions set out above, of a certain number of other provisions that will be dealt with more explicitly below with regard to example embodiments described with reference to the accompanying drawings, but which are in no way limiting.

In these drawings:

FIG. 4 is a schematic vertical section of the light according to the invention.

FIG. 5 is a schematic vertical section of a stigmatic lens with a filament at its focus.

FIG. 6 is a schematic vertical section of a lens according to the invention.

FIG. 7 is a schematic plan view of the entry face of the lens and of vertical planes passing through the centre of the source and forming different angles with the optical axis.

FIG. 14A is a view in section illustrating a lighting and/or signalling device including a light according to the invention.

FIG. 14B is a view in section illustrating a variant of the lighting and/or signalling device of FIG. 14A, FIGS. 14C and 14D are cross-sectional and front views illustrating yet another variant of the lighting and/or signalling device of FIG. 14A.

Figure 1:
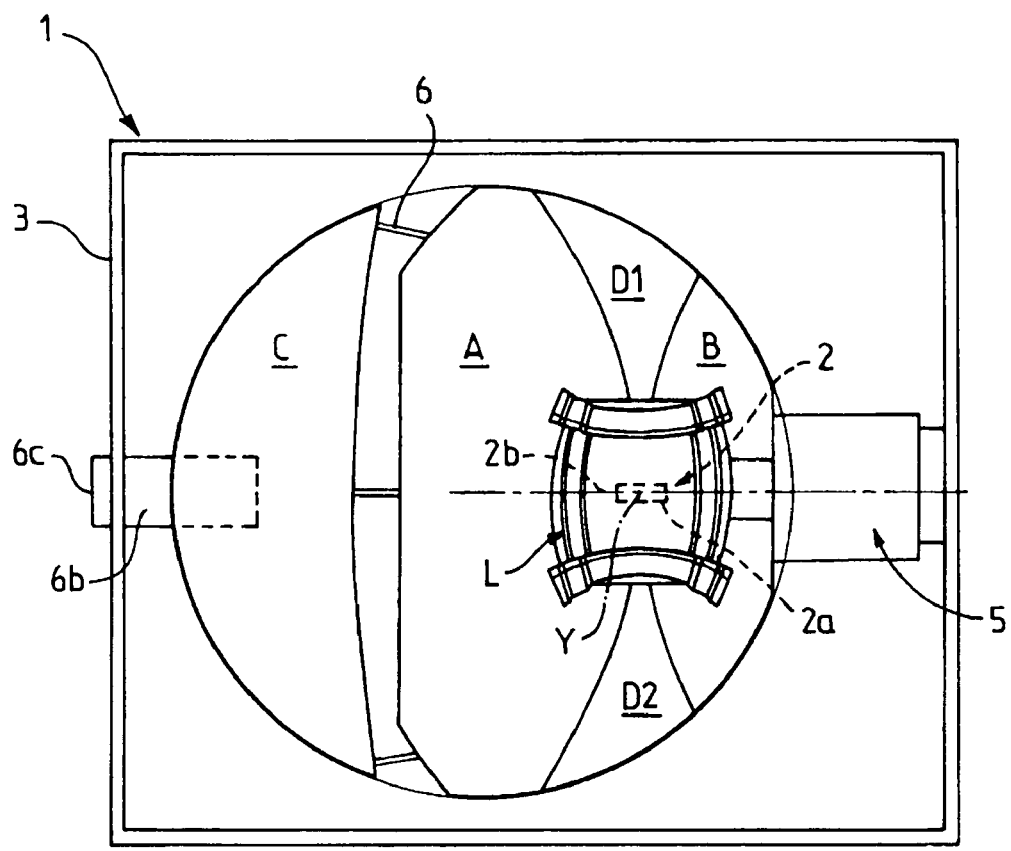
FIG. 1 is a schematic front view of a light according to the invention intended to be mounted on a vehicle.
Figure 2:
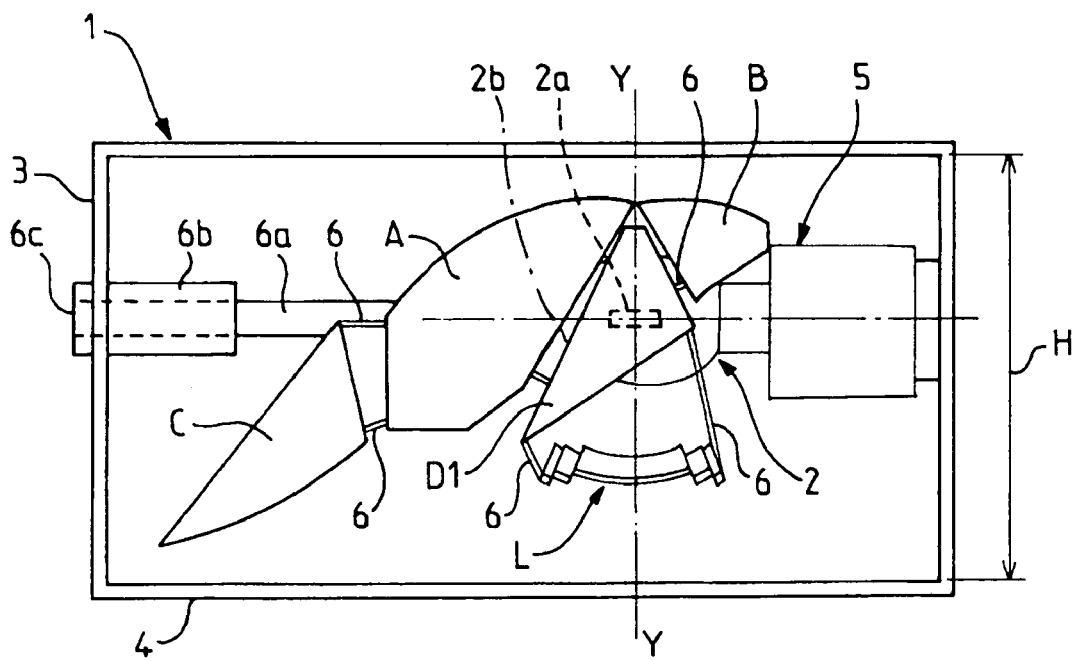
FIG. 2 is a plan view of the light of FIG. 1.

Referring to FIGS. 1 and 2 of the drawings, it is possible to see, depicted schematically, a light 1 for a motor vehicle, intended to be mounted at the front of the vehicle. The light 1 is designed to give a light beam with cutoff. It is a case in particular of a fog light, but the invention can apply to lights with cutoff of another type, for example a dipped headlight.

The light 1 has an optical axis Y-Y and comprises a light source 2 having a filament 2a cylindrical in shape overall, with an essentially horizontal geometric axis 2b, extending transversely to the optical axis Y-Y. In the example shown, the geometric axis 2b of the filament 2a is orthogonal to the axis Y-Y. In a variant, the axis 2b could extend obliquely and form an angle different from 90° with the optical axis Y-Y.

The light comprises a housing 3 in which the source 2 is mounted, this housing being closed towards the front by a cover 4. The housing 3 is fixed to the structure of the vehicle. The support 5 of the light source is fixed sealingly to the housing of the light.

The light source 2 is a low-power source. It consists in particular of a lamp having a transparent envelope or globe, substantially spherical in shape or ellipsoidal. The lamp comprises an axial filament 2a giving a flux less than or equal to 600 lumens, preferably less than 400 lumens. Such a lamp, of the type used for signalling lights, has a power less than that of the lamps used normally for a lighting beam, in particular fog. An example of a source 2 consists of a lamp of the PS 24 type, which does not comprise a mask over part of the filament.

The low power of the source 2 gives rise to a lower heating of the light so that the glass 4 can be moved closer to the filament 2a. This, combined with the transverse arrangement of the source 2, makes it possible to reduce the depth H (FIG. 2) of the light, that is to say its dimension in a direction parallel to the optical axis. In addition, the cover 4 can be produced from plastics material because of the lesser heating.

The light comprises a reflector composed of several reflective sectors A, B, D1, D2 and possibly C.

A lens L is disposed at the front of the light source 2, in the direction of propagation of the light beam. The lens L is determined so as to give a light beam with cutoff. The lens L thus makes it possible to recover the light emitted directly towards the front by the source 2, without causing dazzling to a driver coming in the opposite direction.

The reflective sectors A, B, D1, D2 and possibly C, as well as the lens L, are connected together by connection means 6 depicted schematically. The sectors and the lens L are mounted so as to be able to move in rotation about the geometric axis 2b of the filament 2a to allow vertical adjustment of the cutoff of the light beam without having to move the housing 3 or the source 2. The rotational mounting is achieved for example by means of a shaft 6a, fixed to the sectors, engaged so as to be free in rotation in a sleeve 6b coaxial with 2b, provided on a wall of the housing. The shaft 6a can emerge from the housing in order to be connected to a control 6c allowing adjustment from the outside.

Each reflective sector is in the family of sectors with a complex surface SC defined in the patent application FR-A-2 774 150 in the name of the applicant company; reference can be made to this document for more details. The main points concerning these reflectors will be repeated.

The optical surfaces for all the reflective sectors have the property of creating a reflected light beam with a flat cutoff line, or possibly broken. Generally the cutoff line is horizontal and the light beam is situated below this line.

An appropriate design principle for each sector is disclosed in the patent FR-A-2 774 150.

Sectors A and B

Having regard to the presence of the lens L in front of the lamp 2 (see FIG. 3) it is necessary as far as possible to prevent the rays reflected by the sectors of the reflector, in particular the sectors A and B, from passing through the globe 2c of the lamp. This is because the rays, according to their direction, might risk being diverted by the lens L upwards and creating unacceptable dazzling. In addition, the rays reflected by the globe 2c of the lamp 2 must be considered to be lost or detrimental since the globe 2c causes uncontrolled diversions for rays which do not directly come from the filament 2a. It is therefore necessary also to pass round the globe 2c.

The generatrices of the sectors, in particular the generatrices GA, GB for the sectors A, B, are chosen so that the reflected rays such as r3 in an optical construction with two dimensions (or 2D), in the plane Π, pass around the interfering elements consisting of the lens L and globe 2c.

Construction of the Generatrix GA of Sector A

Figure 3:
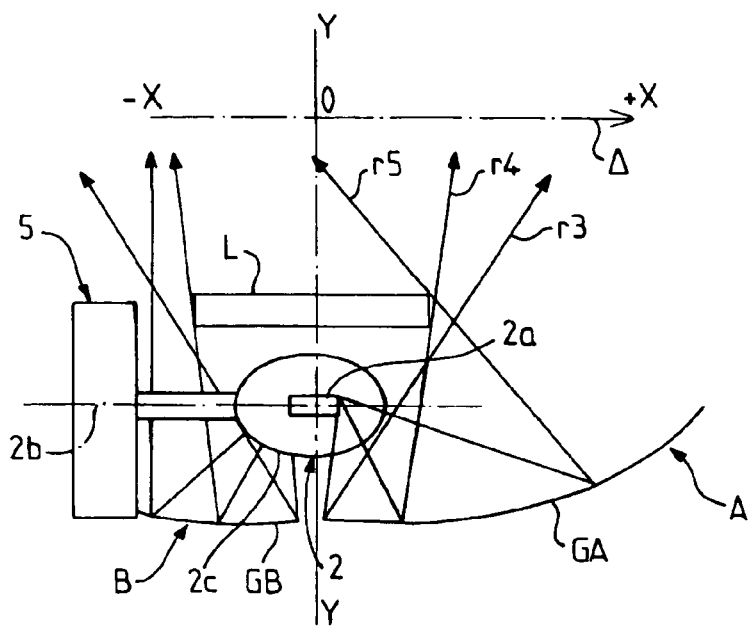
FIG. 3 is a schematic horizontal section of the light according to the invention.

The right hand part of the FIG. 3 shows a limit case where the reflected rays such as r3, r4, r5 are tangent to the obstacles consisting of the lens L and globe 2c.

In a practical construction, the reflected rays have in general higher deviations according to the positive values +x along a direction Δ orthogonal to the optical axis Y-Y. The values +x correspond to a deviation towards the outside, that is to say towards the right in the case of the right-hand light of the vehicle, as illustrated in FIG. 3, with the possible exception of r3. The generating curve GA is constructed so as to optimise the distribution of the light in the beam, subject to the limits described above.

For a given distance F from the initial point of the generatrix GA on the axis Y to the rear of the filament 2a, the dimension of the globe 2c of the lamp imposes the minimum deviation possible for r3. The distance F is preferably chosen so as to be small, in particular less than or equal to 15 mm, and because of this the ray r3 corresponds to a high horizontal deviation; it is often unnecessary, having regard to the width of the beam required (and imposed by regulation R19-3) to provide a greater deviation.

It may be noted that, in the construction disclosed above, the source point of the rays in question is, as far as a point in line with the end of the filament 2a, the bottom right hand corner (towards the reflector and on the same side as the generatrix GA in question) of the projection of the filament onto the plane Π and, beyond, the top right hand corner (towards the lens L, on the same side as the constructed sector).

The sector A of the constructed reflector is delimited by a vertical plane containing the ray r3 in order to extend to the surface the properties of the construction in plan view.

Advantageously, the generatrix GA of the sector A is such that this reflective sector participates essentially in the construction of the beam in the part +x of the direction Δ.

Construction of the Generatrix of the Sector B

Because of the presence of the fixing and positioning system 5 (FIG. 3) that constitutes an opaque part of the housing, for which it can be considered that it defines the position of one of the natural walls of the apparatus, the sector B is designed so as to almost exclusively illuminate towards the inside, that is to say on the part −x of the direction Δ. In the case of the light for the right-hand side of FIG. 3 the part −x corresponds to the part situated to the left of the optical axis Y-Y.

The focal distances of the generatrices GA, GB of the sectors A and B are advantageously equal, so that the two generatrices have a common point at x=0. This is not essential but facilitates the creation of connections with minimum dazzle.

Construction of the Sectors D1, D2

The sectors D1, D2 are fractions, cut as disclosed below, of a single reflector. The generating curve of this single reflector is chosen with a focal distance less than that of the sectors A and B so that the surfaces of the sectors D1, D2 are placed in front of the lateral sectors A, B as can be seen in FIG. 2. This makes it possible to produce connections, for connecting the various sectors together, placed in the shadow of the sectors D1, D2 and therefore not creating any dazzle.

The complete reflector is first of all delimited by the projections along the optical axis Y-Y of the contours of the sectors A and B. In fact it is necessary to provide undercut angles for the removal of the complete piece, produced in particular from plastics material, from the mould, which makes it necessary to take projection axes inclined with respect to the optical axis Y-Y in the plane Π

The resulting reflector, corresponding to the two sectors D1, D2, seen from the rear or in front view, has the form of an hour glass (see FIG. 1). This reflector is then cut by a horizontal plane U2 (FIG. 4) passing through the lowest point of the lens L, which defines the sector D2. Any horizontal ray which came from the reflector and passed between the plane Π and the plane U2 would be diverted upwards by the lens L and would be a source of dazzle.

The sector D1 is delimited, at the bottom part, by a plane situated above the plane Π, so that no ray reflected by D1 reaches the lens L below its intersection with the plane Π. In practice, the sector D1 is delimited by the horizontal plane U1 passing through the highest point of the lens L (FIG. 4).

The generating curve of the reflector corresponding to the sectors D1 and D2 was chosen, in one example embodiment, so as to illuminate all of the field defined by the lighting standard, but this is not essential.

Construction of Sector C

Having regard to the low value chosen for the distance F of the generatrix GA, the sector A rapidly becomes deep when moving away transversely from the optical axis.

If sufficient apparent surface is available, it is advantageous to "fresnelise", that is to say to fragment the sector A by creating a second non-contiguous sector C with merged focal lengths. The sector C has a greater focal length and is situated less towards the front, along the direction of the optical axis, than the extension of the sector A. The offset between the sectors A and C is effected along the axis 2b of the filament 2a. A mechanical connection 6 between the sectors A and C is then preferably provided in line with the filament 2a, as illustrated schematically in FIG. 2. This is because the lamp 2 emits only very little energy in this direction and the connections are then easy to design, with in addition very little loss.

The sector C receives little light energy but procures an extremely thin beam since the filament 2a is seen at small angles. This makes it possible to reinforce the light under the cutoff line proportionally to the lowest level in the beam, which is favourable to compliance with a future lighting standard R19-3 (ratio between lines).

The focal distances of the various sectors, in particular the focal distance of the sectors A and B, are chosen so as to be short, preferably less than or equal to 15 mm, in order better to envelop the filament 2a in a vertical plane: the images thus obtained remain of moderate size and usable over the entire height of the reflectors, because of the transverse orientation of the filament.

Recovering Lens L

The transverse filament 2a emits almost as much energy towards the cover 4 as towards the reflector placed behind. The lens L makes it possible to recover the energy towards the cover whilst creating a cutoff line to prevent dazzle resulting from the direct observation of the filament, this observation also taking place in a direction where the emission indicator of the filament is at a maximum.

FIG. 5 is a diagram in vertical section of a conventional stigmatic planar-convex lens M with a focus 7. The transverse filament 2a being placed so as to be tangential at a lower point, at the focus 7, to the horizontal plane passing through said focus 7, it is clear that the rays such as i6 coming from points on the filament situated in front of the focus 7 will be refracted along rising rays such as r6 that will create dazzle, which is not acceptable.

To resolve this problem, according to the invention as illustrated in FIG. 6, the lens L is determined so as to provide an emerging beam which does not comprise any rising ray and which thus has a horizontal cutoff.

Because of the dimensions of the light, the lens L works horizontally with a high opening (greater than 1). Because of this it is not possible to use a cylindrical lens whose lateral parts would generate rising rays.

The construction of the lens L according to the invention is disclosed below.

Figure 8:
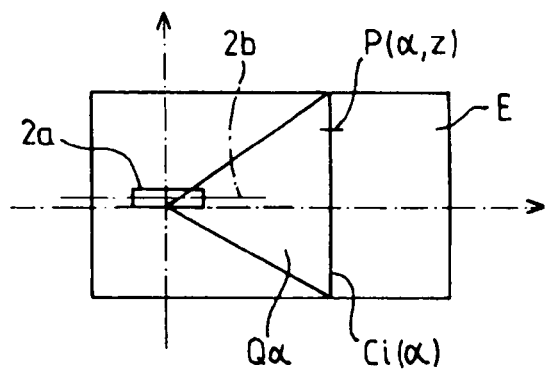
FIG. 8 is a view in elevation of the light source and of the rectangular entry face of the lens.

Referring to FIGS. 7 and 8, it is possible to see the entry surface E of the lens L, which is chosen arbitrarily. In the present case the surface E is chosen so as to be planar, rectangular and vertical. In addition this surface E is parallel to the geometric axis 2b of the filament. A vertical plane $Q\alpha$ is considered, which passes through the centre of the filament 2a and which forms an angle $\alpha$ with the optical axis Y-Y. The angle $\alpha$ can vary from 0 to the value $\alpha n$ corresponding to one of the vertical edges of the entry face E.

The vertical intersection of the plane $Q\alpha$ with the plane of the entry face E is designated $Ci(\alpha)$ and an altitude point z situated on $Ci(\alpha)$ is designated $P(\alpha,z)$.

Figure 9:
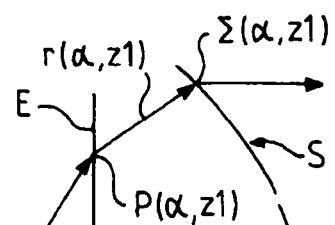
FIG. 9 is a diagram to a larger scale of the projection of the light source onto an oblique incidence plane, with extreme incident rays on the entry face of the lens.
Figure 9:
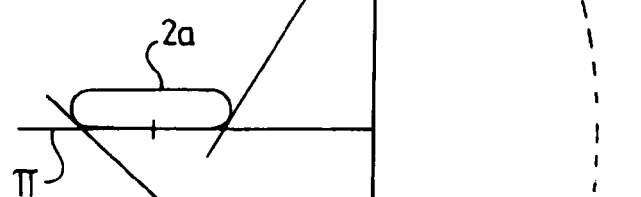

For each point $P(\alpha,z)$, an incident ray is constructed at this point, issuing from the projection of the filament 2a in the plane $Q\alpha$, as illustrated in FIG. 9. The incident ray is contained in the plane $Q\alpha$.

The orthogonal projection of the filament 2a in the plane $Q\alpha$ has ends in the form of an arc of an ellipse.

The lens L is determined so that, at a given point on its exit surface S, there is always at least one horizontal emergent ray whilst the other emergent rays are all descending.

To the end points $P(\alpha,z)$ and $P1(\alpha,z1)$, in the vertical direction, of the entry face of the lens, there correspond the extreme rays tangent respectively to the rear and front extreme contours of the filament 2a.

It can be noted that the end of the filament 2a to be taken into account for the top and bottom of the lens is the end opposite to that used for the construction of the corresponding part of the reflecting sectors.

The ray $\vec{r}(\alpha,z)$ refracted by E at $P(\alpha, z)$, is then calculated (if $\alpha \neq 0$, this ray is outside the plane $Q(\alpha)$).

It is then written that the refraction by the exit face S of the lens of the ray $(P(\alpha,z), \vec{r}(\alpha,z))$ is a horizontal ray, which corresponds to an equation in partial derivatives of the exit surface S sought, considered as a function of $\alpha$ and z.

Since the solution surface exists, it is possible to calculate it progressively (and the result, to within any imprecision due to the discretisation step, does not depend on the construction method chosen). Two methods which are satisfactory are described below.

For any $\alpha$, the following are denoted:
S the exit surface sought,
$S(\alpha)=\{\Sigma(\alpha,z)\in S, \forall z\}$, $S(\alpha)$ is a curve on S which is the site of the points $\Sigma(\alpha,z)$ constituting impacts, on the face S, of the rays refracted along $C_i(\alpha)$
$\vec{n}(\alpha,z)$, the normal to S at a point $\Sigma(\alpha, z)$.

The following is written $$\Sigma(\alpha,z)=P(\alpha,z)+\mu\cdot\vec{r}(\alpha,z)$$

In both cases, the starting point is the construction in $\alpha=0$.
$\vec{r}(0,z)\in Q(0), \forall z$ and the construction of the corresponding points of the exit face is a problem in two dimensions $(S(0)\subset Q(0)$ and $\vec{n}(0,z)\in Q(0), \forall z)$.

S(0), considered as a function of z, is then a solution of a simple differential equation, which can be solved by a conventional method.

Let $d\alpha$ and $dz$ be the calculation steps,

Let $\alpha \neq 0$:

$S(\alpha-d\alpha)$ is known $\forall z, \vec{n}(\alpha-d\alpha,z)$ is also known 1$^{st}$ Method:
The following is written:

$$\vec{n}(\alpha,z)=\overline{\Sigma(\alpha,z)\Sigma(\alpha-d\alpha,z)}\wedge\overline{\Sigma(\alpha,z)\Sigma(\alpha-d\alpha,z-dz)}$$

and the writing of the horizontality condition of the ray refracted at a point $\Sigma(\alpha,z)$ is then a simple equation in $\mu$.

2$^{nd}$ Method:
The following is written:

$$\overline{\Sigma(\alpha,z)\Sigma(\alpha-d\alpha,z)}\perp\vec{n}(\alpha-d\alpha,z),$$

which constitutes a simple equation in $\mu$.

The writing of the horizontality condition of the ray refracted at a point $\Sigma(\alpha,z)$ then makes it possible to calculate $\vec{n}(\alpha,z)$.

H(z) designates the curve corresponding to the cross-section, through a horizontal plane of altitude z, of the exit face S of the lens L.

The construction of the curve $H(0)=\{\Sigma(\alpha,0), \forall\alpha\}$, which is the cross-section of the exit face S through the horizontal plane $\pi$ of altitude $z=0$, is a problem in two dimensions ($\vec{r}(\alpha,0)\in\Pi, \vec{n}(\alpha,0)\in\Pi$), that the horizontality condition of the exit rays does not make it possible to resolve (writing this condition along H(0) is equivalent to 0=0). H(0) therefore seems at first sight to be a parameter making it possible to check the horizontal distribution of the light in the beam generated (by analogy with G). However, if the global partial derivative equation is actually solvable, the two methods above must lead to identical solutions when $d\alpha\to 0$ and $dz\to 0$ and the second method tends towards a curve H(0) perpendicular to the rays $(P(\alpha, 0), \vec{r}(\alpha,0))$. In the context of the first method, it can be seen that it is necessary to calculate H(0) first (the formula given above not making it possible to calculate $\vec{n}(\alpha,0), \forall\alpha$): the solution is then given by the previous consideration (curve perpendicular to the rays). It can thus be seen that H(0) is not a parameter.

The parameters are therefore finally, for a given entry surface E (E constitutes a parameter, but one that is difficult to handle: in practice only planar entries perpendicular to the optical axis of the system are considered):

the horizontal deviation and

μ for the point Σ(0,0).

If the chosen deviation is nil, μ is the thickness at the centre, and it is necessary to chose a nil horizontal deviation at the centre in order to obtain a smooth exit surface (which is not essential, but was preferred in the embodiments).

Appearance of the Lens L

The lens L obtained above is satisfactory from an optical point of view. It is asymmetric at the top and bottom and is curved in plan view (cf construction of H(z)). The lens L is of great thickness when its dimensions and position are chosen so as to be well integrated in the application in question (PS24 lamp, compact fog). The lens was then segmented into pads or blocks like a Fresnel lens, that is to say, the recovering lens L was "fresnelised".

Figure 10:
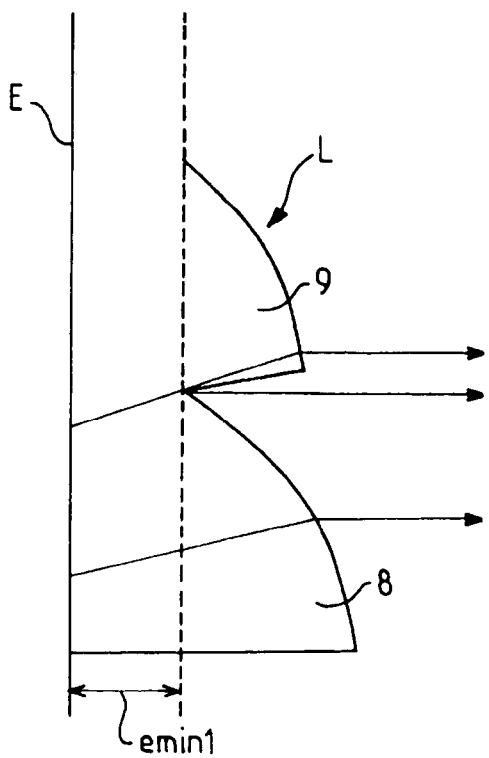
FIG. 10 is a partial vertical section of the lens to a larger scale.

A first conventional operation, illustrated in FIG. 10 in projection in a vertical plane, can be implemented simply during the calculation of the curves S(α), by judiciously extending, in three dimensions, the limit rays corresponding to the minimum acceptable thickness emin1 (the thickness at the centre is intentionally chosen so as to be small, in the interest of the injection method). In this way blocks 8, 9 are created, limited towards the front by a convex surface. The blocks follow each other vertically with steps.

This operation by itself allows only a negligible decrease in the global thickness of the lens since the horizontal sections formed by the curves H(z)={Σ(α,z) ∈ S,∀α} close up equally rapidly towards the entry face, in particular towards the top of the lens.

The method is also applied to the lines H(z).

Figure 11:
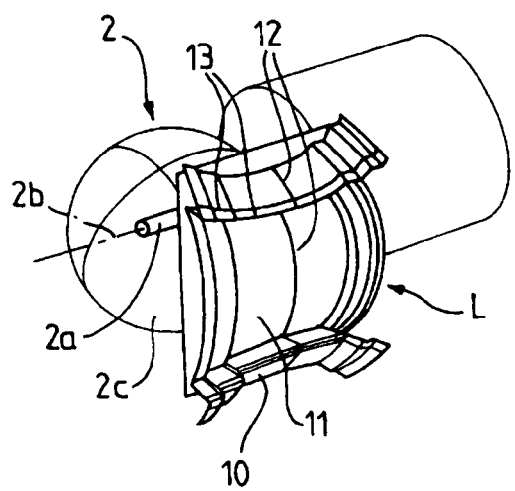
FIG. 11 is a view in perspective of the front of the lens and of the light source.

The complete method then consists of "fresnelising" S(0), and then all the other sections S(α), for the same values of z. For these values of z, the curves H are then "fresnelised" for a minimum thickness: emin2<emin1. The result is a mesh of blocks 10, 11 (FIG. 11) according to two families of curves of S: iso α curves 12 (α constant) and iso z curves 13 (z constant).

An emergent light beam of the desired shape is obtained.

It is seen that a rotation about the axis 2b of the filament does not modify any optical characteristic (π, which remains tangent to the filament, is moved) and amounts simply to moving the vertical, which is the adjustment function necessary for a fog light. The lamp can remain fixed to the housing.

The lens L is advantageously produced from plastics material.

Figure 12:
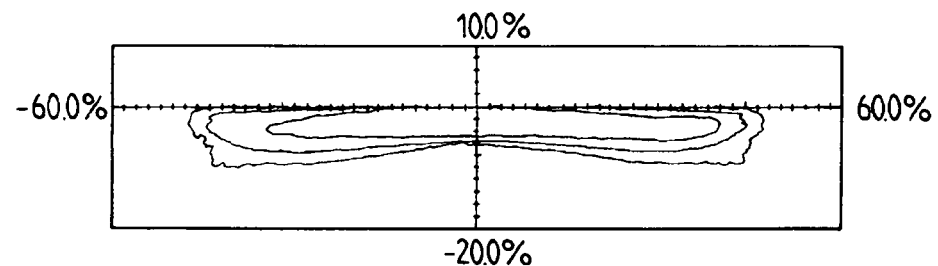
FIG. 12 illustrates the isolux curves obtained with the lens alone.

FIG. 12 illustrates a network of isolux curves obtained with the source 2 and solely the lens L. The horizontal cutoff of the beam appears clearly, the illuminated zone being situated below a horizontal line.

Figure 13:
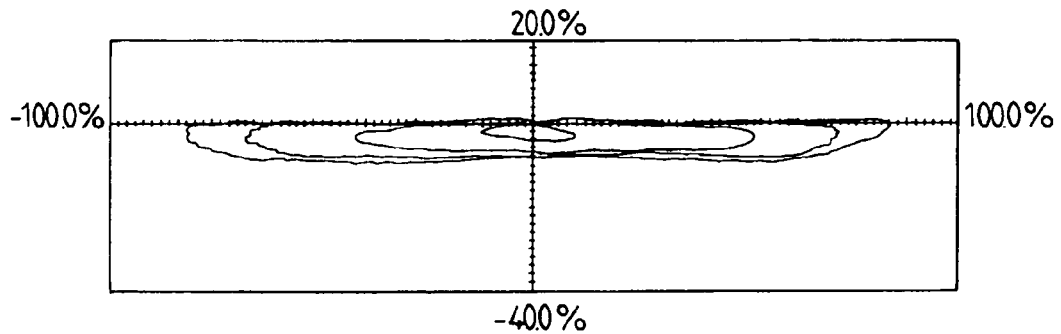
FIG. 13 illustrates the isolux curves of the complete beam obtained with the lens and the reflector.

FIG. 13 illustrates the network of isolux curves of the global network obtained with the source 2, the reflecting sectors A, B, D1, D2, C and the lens L. The horizontal cutoff is preserved, with reinforced illumination spread below the cutoff.

A light according to the invention has many advantages, in particular the following:

compactness, the depth being reduced;

the possibility of a plastic cover because of a low-power lamp that is nevertheless sufficient because of an adapted light distribution and efficiency of the optical system (outside the closure cover) attaining 50%, very thin beam, adapted to the future regulation R19-3.

The description given with regard to a right-hand light is immediately transposed to the left-hand light, by symmetry about a longitudinal vertical plane.

With reference to FIGS. 14A to 14E, a description is now given of different variants of a lighting and/signalling device 10 integrating a light 1 according to the invention. The device 10 described here is in the form of a light offering two automobile lighting/signalling functions, namely the fog function and the daytime running function (referred to as DRL, standing for "Daytime Running Light" in English).

The device 10 comprises a light 1 according to the invention that is contained in a housing 3', the said housing 3' being extended dimensionally compared with the housing 3 of the embodiment described above with reference to FIGS. 1 to 13. The housing 3' is closed by a cover 4'.

This housing 3' of greater dimensions makes it possible to house another light source 2' dedicated to the daytime running function. This light source 2' is for example a filament lamp with a power of 15 W.

As is clear in FIGS. 14A to 14E, the light source 2' can be mounted in different ways with respect to the optical axis of the device 10. A mounting parallel to the optical axis (the case of FIGS. 14A and 14E) and a mounting transverse to the optical axis (the case of FIGS. 14B, 14C and 14D) are shown by way of examples.

It should be noted here that the reflector, designated R, of the light 1 is shown in a simplified manner in FIGS. 14A to 14E, essentially for reasons of convenience. Naturally the reflector R comprises the sectors A, B, D1, D2 and possible C, not shown, as described previously.

In the depicted embodiments of the device 10, the internal surface of the housing 3' is adapted to the required photometric pattern for the daytime running function. Thus the internal surface of the housing 3' is at least partly covered with a reflective coating that allows a reflection of light beams $F_{DRL}$ emitted by the source 2'. In a variant (not shown), a reflector is associated with the source 2' and it is then not essential to make the internal surface of the housing 3' reflective.

With reference more particularly to FIGS. 14C and 14D, the device 10 can comprise a lens L' in the form of an extension of the lens L of the light 1. In some applications, this lens L' affords more flexibility in the design of the photometric pattern of the daytime running function.

Figure 14E:
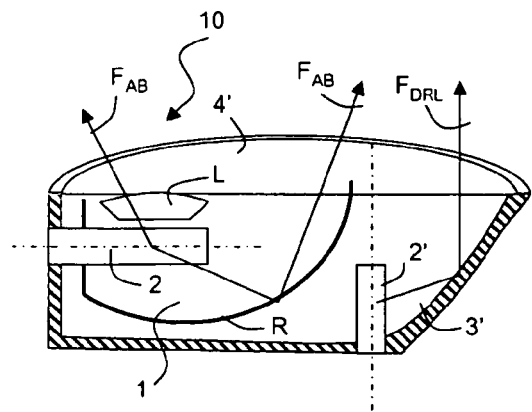
FIG. 14E is a view in section illustrating yet another variant of the lighting and/or signalling device of FIG. 14A.
Figure 14E:
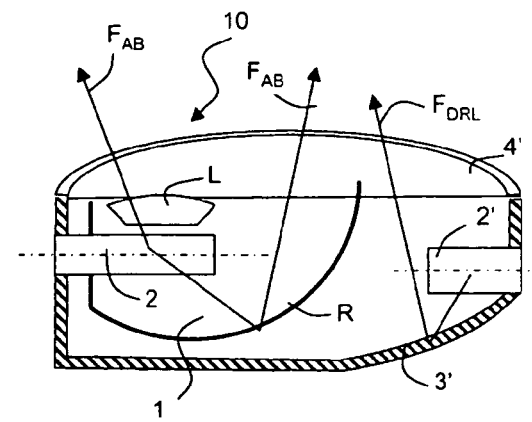
Figure 14E:
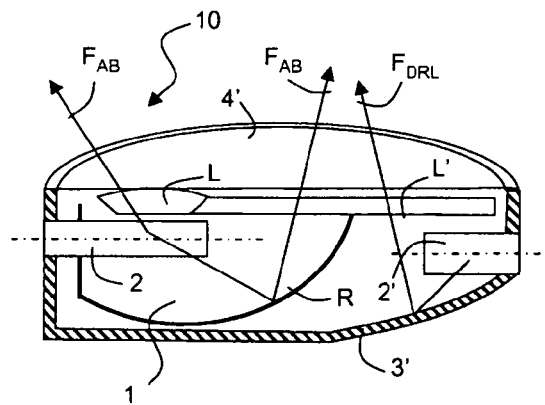
Figure 14E:
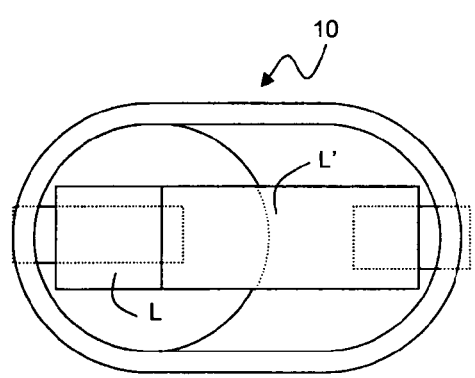
Figure 14E:
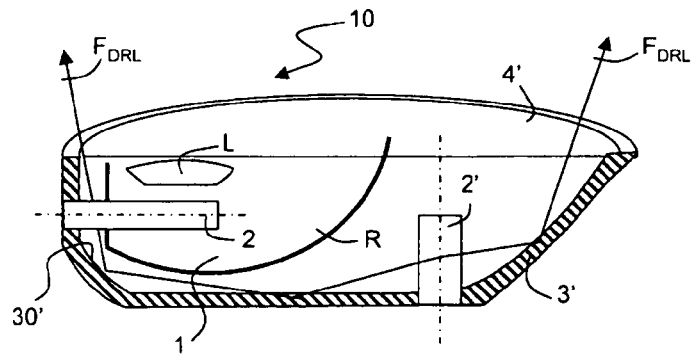

With reference more particularly to FIG. 14E, the device 10 can comprise a housing 3' having a focussed indirect internal reflection part 30' that allows passage of the beams $F_{DRL}$ around the reflector R and the source 2. This characteristic makes it possible to obtain a greater illuminating surface for the daytime running function.

It should be noted here that the production of the device 10 is made possible by the great compactness of the light 1 according to the invention. It thus becomes possible to offer the fog function and the daytime running function in a device 10 whose dimensions remain similar to those of conventional fog light.

It should also be noted that, in certain embodiments of the device 10, the daytime running function will be obtained by means of two light sources 2 and 2', by the combination of light beams $F_{AB}$ emitted by the source 2 and light beams $F_{DRL}$ emitted by the source 2'. In such a case, the light source 2 can for example be supplied at lower voltage.

What is claimed is:

1. A motor vehicle light for producing a light beam with cutoff, in particular of the fog type, the light having a housing with a front cover and an optical axis and comprising:

(a) a light source comprising a filament having a substantially cylindrical overall shape and a substantially horizontal axis, the filament extending obliquely or perpendicular to the optical axis of the light;
(b) at least one reflector which produces a reflected light beam with cutoff; and
(c) a lens disposed in front of the light source, which produces a light beam with cutoff, thus eliminating the need for a shield in front of the light source.

2. The light according to claim 1, wherein the lens is configured so that the extreme incident rays are refracted, at the exit from the lens, substantially parallel to the optical axis, whilst the other light rays emitted by the rest of the light source are refracted with a downward inclination with respect to the optical axis.

3. The light according to claim 1, wherein the light source is of low power and supplies a flux less than that generated by a lamp of the dipped-beam type, the lens close to the light source and the whole of the light is produced from plastics material.

4. The light according to claim 3, wherein the light source supplies a flux less than or equal to 900 lumens, in particular less or equal to 600 lumens.

5. The light according to claim 1, wherein the light source is mounted fixed to the housing of the light.

6. The light according to claim 5, wherein the light source is oriented substantially perpendicular to the optical axis and the at least one reflector and the lens are fixed to each other and mounted so as to rotate about the axis of the light source to allow the adjustment of the light.

7. The light according to claim 1, wherein the light source consists of a lamp with an axial filament and is disposed transversely or obliquely.

8. The light according to claim 1, wherein the light front cover is produced from plastics material, in particular thermoplastic.

9. The light according to claim 1, wherein the lens comprises a planar, rectangular and vertical entry surface.

10. The light according to claim 1, wherein the lens is asymmetric at the top and bottom and preferably curved in plan view.

11. The light according to claim 1, wherein the lens is of the Fresnel lens type in the vertical direction and in the horizontal direction, and the lens comprises an exit face having blocks for producing a light beam with cutoff.

12. The light according to claim 11, wherein the exit face of the lens has a mesh of blocks according to two families of curves.

13. The light according to claim 1, wherein the reflector comprises at least two first sectors which extend above and below a horizontal plane passing through the axis of the light source and at least two second sectors disposed between the at least two first sectors and one of the at least two second sectors being situated above the horizontal plane and another of the at least two second sectors being situated below the horizontal plane.

14. The light according to claim 13, wherein the light rays reflected from the at least two first sectors pass around the lens and the light source.

15. The light according to claim 14, wherein one of the at least two first sectors is associated with a non-contiguous sector having a greater focal length than the focal lengths of either of the at least two first sectors.

16. The light according to claim 14, wherein the at least two second sectors situated above and below the horizontal plane passing through the axis of the light source are fractions of a single reflector.

17. The light according to claim 16, wherein the at least two second sectors have a focal length less than that of the at least two first sectors so that the surfaces of the at least two second sectors are placed in front of the at least two first sectors, in particular in order to produce connections placed in the shadow of the top and bottom sectors and not creating any dazzle.

18. The light according to claim 13, wherein the focal lengths of the at least four sectors are less than or equal to 15 mm.

19. A lighting and/or signalling device for a motor vehicle, comprising a light according to claim 1 and at least one supplementary light source dedicated to the fulfilment of another lighting and/or signalling function.

20. The device according to claim 19, wherein the light fulfils a fog function and the other lighting and/or signalling function is a daytime running function.

21. The device according to claim 19, wherein the supplementary light source is mounted parallel or transversely to the optical axis of the device.

22. The device according to claim 19, comprising a housing with an internal surface having at least one reflective part able to reflect light beams emitted directly or indirectly by the supplementary light source.

23. The device according to claim 19, comprising a lens associated with the supplementary light source and forming an extension of the lens of the light.

24. A motor vehicle, comprising at least one light according to claim 1.

* * * * *